US012292698B2

(12) United States Patent
Kusukawa

(10) Patent No.: US 12,292,698 B2
(45) Date of Patent: May 6, 2025

(54) IMAGE FORMING APPARATUS CONTROLLING VOLTAGE APPLIED TO ELECTRODES OF CHARGING DEVICES

(71) Applicant: CANON KABUSHIKI KAISHA, Tokyo (JP)

(72) Inventor: Hiroshi Kusukawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/226,099

(22) Filed: Jul. 25, 2023

(65) Prior Publication Data

US 2024/0036491 A1 Feb. 1, 2024

(30) Foreign Application Priority Data

Jul. 26, 2022 (JP) ................................ 2022-118679
Jul. 14, 2023 (JP) ................................ 2023-115662

(51) Int. Cl.
*G03G 15/01* (2006.01)
*G03G 15/02* (2006.01)
(Continued)

(52) U.S. Cl.
CPC ......... *G03G 15/0291* (2013.01); *G03G 15/01* (2013.01); *G03G 15/0266* (2013.01); (Continued)

(58) Field of Classification Search
CPC .. G03G 15/01; G03G 15/011; G03G 15/0136; G03G 15/0178; G03G 15/0189;
(Continued)

(56) References Cited

U.S. PATENT DOCUMENTS 10,429,787 B2 10/2019 Kitajima
2003/0016961 A1* 1/2003 Kitajima ........... G03G 15/0266 399/50

(Continued)

FOREIGN PATENT DOCUMENTS

JP 09-127764 A 5/1997
JP 2016-048356 A 4/2016
JP 2018-025683 A 2/2018

OTHER PUBLICATIONS

U.S. Appl. No. 18/496,249, Tadashi Fukuda Hiroshi Kusukawa, filed Oct. 27, 2023.

*Primary Examiner* — Robert B Beatty
(74) *Attorney, Agent, or Firm* — Venable LLP

(57) ABSTRACT

In an image forming mode, in which a first image forming portion forms a toner image on a first image bearing member and a second image forming portion does not form a toner image on a second image bearing member, thereby forming an image on a recording material, a first voltage lower than a minimum value of absolute values of a plurality of voltages applied to a plurality of grid electrodes of the first image forming portion and higher than an absolute value of a target potential of a surface of the second image bearing member in the image forming mode is applied to one of a plurality of grid electrodes of the second image forming portion, and no voltage is applied to the other grid electrodes except the grid electrode to which the first voltage is applied among the plurality of grid electrodes of the second image forming portion.

14 Claims, 9 Drawing Sheets

(51) Int. Cl.
*G03G 15/04* (2006.01)
*G03G 15/16* (2006.01)

(52) U.S. Cl.
CPC ... *G03G 15/04009* (2013.01); *G03G 15/1615* (2013.01); *G03G 15/162* (2013.01); *G03G 2215/0103* (2013.01); *G03G 2215/0122* (2013.01); *G03G 2215/026* (2013.01); *G03G 2215/0643* (2013.01)

(58) Field of Classification Search
CPC ............... G03G 15/02; G03G 15/0266; G03G 15/0291; G03G 15/1605; G03G 2215/0103; G03G 2215/0122; G03G 2215/026
USPC ........................... 399/50, 171, 179, 299, 302
See application file for complete search history.

(56) References Cited

U.S. PATENT DOCUMENTS

2005/0226644 A1* 10/2005 Ino ..................... G03G 15/0291 399/50
2007/0147858 A1* 6/2007 Inukai ................ G03G 15/0291 399/31
2009/0052915 A1* 2/2009 Claflin, Jr. ......... G03G 15/0266 399/172
2013/0279939 A1* 10/2013 Nagamori .......... G03G 15/0291 174/133 R
2014/0270847 A1* 9/2014 Uenishi .............. G03G 15/0291 399/115
2016/0161878 A1 6/2016 Kitajima
2018/0149994 A1* 5/2018 Ogawara ................. H02M 1/08

* cited by examiner

IMAGE FORMING APPARATUS CONTROLLING VOLTAGE APPLIED TO ELECTRODES OF CHARGING DEVICES

BACKGROUND OF THE INVENTION

Field of the Invention

The present invention relates to an image forming apparatus including a plurality of image forming portions having a charging device including a plurality of corona chargers.

Description of the Related Art

In image formation of an electrophotographic system, an electrostatic latent image is formed on an image bearing member uniformly charged by a charging device, and charged toner is supplied from a developing device to the electrostatic latent image to visualize the electrostatic latent image as a toner image. Then, the toner image formed on the image bearing member is transferred to a recording material by a transfer device, and is fixed to the recording material by being heated and pressurized by a fixing device. In general, an image forming apparatus includes a plurality of image forming portions that forms a toner image on an image bearing member, and the image forming portions include a charging device and a developing device.

A corona charger is widely used as a charging device for charging an image bearing member. In general, a corona charger includes a discharge electrode that generates a charge by discharge, a grid electrode that adjusts an amount of charge to reach an image bearing member, and a shield electrode disposed so as to surround the discharge electrode so that the charge does not leak out of a direction of the image bearing member.

Japanese Patent Application Laid-Open No. 2016-48356 A proposes an image forming apparatus in which all image bearing members and an intermediate transfer member are in contact when any of a plurality of image forming portions forms an image. In such an image forming apparatus, there is a case where an image forming portion that forms a toner image and an image forming portion that does not form a toner image are driven in a mixed manner, such as a black (Bk) single-color mode. In this case, in Japanese Patent Application Laid-Open No. 2016-48356 A, control is performed such that the absolute value of the high voltage applied to the discharge electrode and the grid electrode of the charging device of the image forming portion that does not form the toner image is lowered with the same polarity as the high voltage applied to the discharge electrode and the grid electrode of the charging device of the image forming portion that forms the toner image. This is control to prevent the surface potential of the image bearing member from having a polarity opposite to that at the time of image formation when the image bearing member in an uncharged state rubs with the intermediate transfer member or a fur brush and to prevent charging unevenness in which the surface potential of the image bearing member becomes non-uniform at the time of forming the next toner image.

US 2016/0161878 proposes a charging device including a plurality of corona chargers, and each of the corona chargers includes a discharge electrode, a grid electrode, a shield electrode, and a voltage application portion that can be independently controlled. The charging device including the plurality of corona chargers has a configuration capable of solving the shortage of the charging performance due to the increase in the rotation speed of the image bearing member due to the increase in the image output speed. Further, in US 2016/0161878, the control of charging the surface of the image bearing member using the charging device has the following configuration. That is, it is configured such that the amount of charge on the surface of the image bearing member is secured by an upstream corona charger located on the upstream side in the rotation direction of the image bearing member, and the charging unevenness on the surface of the image bearing member is suppressed by a downstream corona charger located on the downstream side in the rotation direction of the image bearing member.

In Japanese Patent Application Laid-Open No. 201648356 A, when an image forming portion that forms a toner image and an image forming portion that does not form a toner image are driven in a mixed manner, a high voltage having the same polarity and a low absolute value as those of the grid electrode of the image forming portion that forms a toner image is applied to the grid electrode of the image forming portion that does not form a toner image.

However, in Japanese Patent Application Laid-Open No. 2016-48356 A, as described above, a high voltage for weakly charging the surface of the image bearing member is also applied to the grid electrode of the image forming portion that does not form a toner image, so that deterioration of the grid electrode progresses. That is, in the control of Japanese Patent Application Laid-Open No. 2016-48356 A, even in the image forming portion that does not form the toner image, the deterioration of the grid electrode progresses, and the occurrence of the charging unevenness and the occurrence of the image unevenness due to the deterioration of the grid electrode are accelerated.

On the other hand, it is necessary to weakly charge the surface of the image bearing member of the image forming portion that does not form a toner image in order to prevent charging unevenness of the image bearing member at the time of forming the next toner image, and it is necessary to apply a high voltage to the grid electrode in order to charge the surface of the image bearing member.

SUMMARY OF THE INVENTION

It is desirable to suppress shortening of the service life of a charging device including a plurality of corona chargers.

A configuration of the present invention provides an image forming apparatus that forms an image on a recording material, comprising:

a first image forming portion including a rotatable first image bearing member and a first charging device configured to charge the first image bearing member by a plurality of corona chargers including a first corona charger having a first discharge electrode and a first grid electrode and disposed at a most upstream position in a rotation direction of the first image bearing member, and a second corona charger having a second discharge electrode and a second grid electrode and disposed at a most downstream position in the rotation direction of the first image bearing member, the first image forming portion being configured to form a toner image on the first image bearing member;

a second image forming portion including a rotatable second image bearing member and a second charging device configured to charge the second image bearing member by a plurality of corona chargers including a third corona charger having a third discharge electrode and a third grid electrode and disposed at a most upstream position in a rotation direction of the second image bearing member and a fourth corona charger having a fourth discharge electrode and a fourth grid electrode and disposed at a most downstream position in the rotation direction of the second image bearing member, the second image forming portion being configured to form a toner image on the second image bearing member;

an intermediate transfer member which is disposed so as to be in contact with each of the first image bearing member and the second image bearing member and to which the toner image formed on the first image bearing member is transferred; and a controller configured to control each of the first image forming portion and the second image forming portion so that an image forming mode in which, in a state in which the intermediate transfer member is in contact with each of the first image bearing member and the second image bearing member and in a state in which each of the first image bearing member and the second image bearing member is rotationally driven, the first image forming portion forms a toner image on the first image bearing member and the second image forming portion does not form a toner image on the second image bearing member, thereby forming an image on the recording material, is executed, wherein, in the image forming mode, a first voltage smaller than a minimum value of absolute values of a plurality of voltages applied to a plurality of grid electrodes of the first image forming portion and larger than an absolute value of a target potential of a surface of the second image bearing member in the image forming mode is applied to one of the plurality of grid electrodes of the second image forming portion, and no voltage is applied to other grid electrodes except the grid electrode to which the first voltage is applied among the plurality of grid electrodes of the second image forming portion.

Another configuration of the present invention provides an image forming apparatus that forms an image on a recording material, comprising:

a first image forming portion including a rotatable first image bearing member and a first charging device configured to charge the first image bearing member by a plurality of corona chargers including a first corona charger having a first discharge electrode and a first grid electrode and disposed at a most upstream position in a rotation direction of the first image bearing member, and a second corona charger having a second discharge electrode and a second grid electrode and disposed at a most downstream position in the rotation direction of the first image bearing member, the first image forming portion being configured to form a toner image on the first image bearing member;

a second image forming portion including a rotatable second image bearing member and a second charging device configured to charge the second image bearing member by a plurality of corona chargers including a third corona charger having a third discharge electrode and a third grid electrode and disposed at a most upstream position in a rotation direction of the second image bearing member and a fourth corona charger having a fourth discharge electrode and a fourth grid electrode and disposed at a most downstream position in the rotation direction of the second image bearing member, the second image forming portion being configured to form a toner image on the second image bearing member;

an intermediate transfer member which is disposed so as to be in contact with each of the first image bearing member and the second image bearing member and to which the toner image formed on the first image bearing member is transferred; and a controller configured to control each of the first image forming portion and the second image forming portion so that an image forming mode in which, in a state in which the intermediate transfer member is in contact with each of the first image bearing member and the second image bearing member and in a state in which each of the first image bearing member and the second image bearing member is rotationally driven, the first image forming portion forms a toner image on the first image bearing member and the second image forming portion does not form a toner image on the second image bearing member, thereby forming an image on the recording material, is executed, wherein, in the image forming mode, a first voltage smaller than a minimum value of absolute values of a plurality of voltages applied to a plurality of grid electrodes of the first image forming portion and larger than an absolute value of a target potential of a surface of the second image bearing member in the image forming mode is applied to one of the plurality of grid electrodes of the second image forming portion, and a second voltage smaller than an absolute value of a target potential of a surface of the second image bearing member in the image forming mode is applied to the other grid electrodes except the grid electrode to which the first voltage is applied among the plurality of grid electrodes of the second image forming portion.

Further features of the present invention will become apparent from the following description of exemplary embodiments with reference to the attached drawings.

DESCRIPTION OF THE EMBODIMENTS

Hereinafter, preferred embodiments of the present invention will be exemplarily described in detail with reference to the drawings. However, the dimensions, materials, shapes, relative arrangements, and the like of the components described in the following embodiments should be appropriately changed depending on the configuration of the device to which the present invention is applied and various conditions, and the scope of the present invention is not intended to be limited to them.

First Embodiment

An image forming apparatus according to a first embodiment will be described with reference to FIGS. 1 to 5.

<Outline of Image Forming Apparatus>

First, the overall configuration and operation of the image forming apparatus of the present embodiment will be described. An image forming apparatus of an electrophotographic system supplies charged toner from a developing device to an electrostatic latent image formed on an image bearing member to form a visible image (toner image), transfers the toner image to a recording material, applies heat and pressure to fix the toner image to the recording material, and outputs the toner image as a permanent image.

Examples of the recording material usable in the image forming apparatus include various types of sheet materials such as sheet of paper including plain paper, thick paper, rough paper, uneven paper, and coated paper, an overhead projector (OHP) sheet, a plastic film, and cloth.

<Configuration of Image Forming Apparatus>

Figure 1:
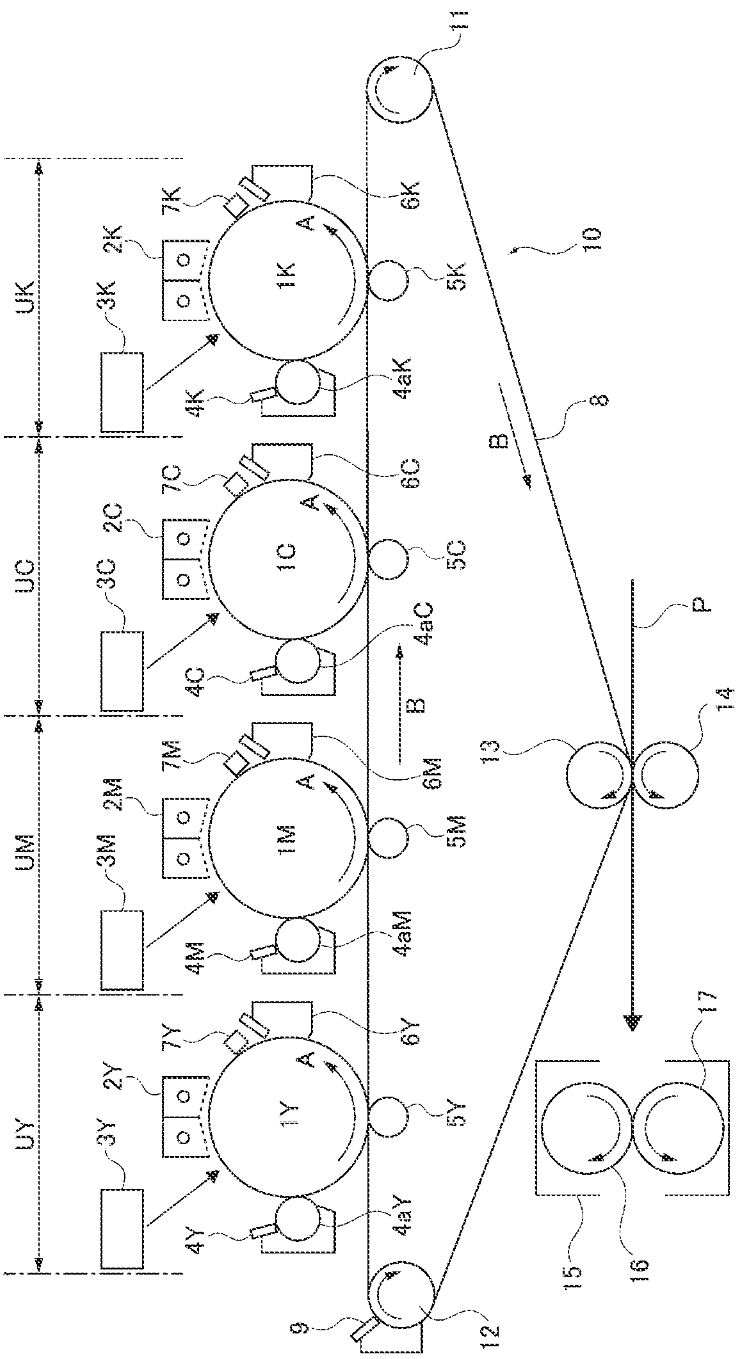
FIG. 1 is a schematic diagram of an image forming apparatus.

FIG. 1 is a schematic view of an image forming apparatus according to the present embodiment. The image forming apparatus illustrated in FIG. 1 is a color image forming apparatus of an intermediate transfer tandem system in which image forming portions UY, UM, UC, and UK of four colors (yellow, cyan, magenta, black) are arranged in the apparatus so as to face an intermediate transfer member 8.

The image forming apparatus of the present embodiment includes four image forming portions U (UY, UM, UC, UK) capable of forming a toner image on a photosensitive drum 1 (1Y, 1M, 1C, 1K) as an image bearing member. The image forming apparatus includes an intermediate transfer device 10 that transfers the toner image on the photosensitive drum 1 to the recording material P, and a fixing device 15 that fixes the toner image on the recording material P as a permanent image. The intermediate transfer device 10 is disposed below the image forming portion U.

The image forming portions U have the same configuration except that the toner images to be formed have different colors of yellow (Y), magenta (M), cyan (C), and black (K).

Each image forming portion U includes a drum-type electrophotographic photosensitive member (hereinafter, referred to as a photosensitive drum.) 1 as a rotatable image bearing member. The photosensitive drum 1 is rotationally driven at a predetermined circumferential velocity in the direction of arrow A. In addition, the photosensitive drum 1 includes a charging device 2, an exposure device 3, a developing device 4, a primary transfer roller 5, and a cleaner 6 as process units (process devices) acting on the photosensitive drum 1 sequentially disposed around the drum along the rotation direction of the photosensitive drum 1.

An operation of forming a toner image on the photosensitive drum 1 in the image forming portion U will be described. The image forming portion U performs charging processing on the surface of the photosensitive drum 1 rotating in the arrow direction by the charging device 2 (2Y, 2M, 2C, 2K). An electrostatic latent image is formed on the photosensitive drum 1 by exposing the charged surface of the photosensitive drum 1 by an exposure device 3 (3Y, 3M, 3C, 3K) driven by a laser driver (not illustrated). The electrostatic latent image is developed by a developing device 4 (4Y, 4M, 4C, 4K) to form toner images of yellow, magenta, cyan, and black on the photosensitive drum 1, respectively.

As illustrated in FIG. 1, the developing device 4 (4Y, 4M, 4C, 4K) includes a developing sleeve **4*a* (4*a*Y, 4*a*M, 4*a*C, 4*a*K) that bears and conveys the developer at a position where the electrostatic latent image formed on the photosensitive drum 1 is developed. By the developing bias applied to the developing sleeve 4*a*, the toner in the developer borne on the developing sleeve 4*a* flies toward the electrostatic latent image formed on the photosensitive drum 1, and the electrostatic latent image formed on the photosensitive drum 1** is developed.

In the present embodiment, the exposure device 3 and the developing device 4 in each of the image forming portions U are toner image forming units that form a toner image on the surface of the photosensitive drum 1 charged by the charging device 2.

Next, the operation of the intermediate transfer device 10 that transfers the toner image formed by each image forming portion U onto the recording material P will be described. The toner image formed on the photosensitive drum 1 is primarily transferred and superimposed on the intermediate transfer member 8 stretched on the rollers 11, 12, and 13 and traveling in the direction of arrow B by a transfer bias by the primary transfer roller 5 (5Y, 5M, 5C, 5K).

As described above, in the full-color image forming mode, the toner images of the respective colors of Y, M, C, and K formed on the surface of the photosensitive drum 1 of the image forming portion U of each color are sequentially superimposed and transferred onto the surface of the intermediate transfer member 8 rotating in contact with the photosensitive drum 1 in each image forming portion U. As a result, a four-color superimposed toner image of color Y+color M+color C+color K is formed on the surface of the intermediate transfer member 8.

In other words, in the full-color image forming mode, the photosensitive drums 1Y, 1M, 1C, and 1K of all the image forming portions UY, UM, UC, and UK are driven (rotated) to form toner images on the photosensitive drums of all the image forming portions.

On the other hand, in the monochrome image forming mode, a color K toner image is formed only on the surface of the photosensitive drum 1K of the color K image forming portion UK, and the color K toner image is transferred to the surface of the intermediate transfer member 8 that rotates in contact with the photosensitive drum 1K in the image forming portion UK. In the image forming portions UY, UM, and UC of colors other than K, the photosensitive drums 1Y, 1M, and 1C come into contact with the intermediate transfer member 8 and are rotationally driven (idle rotation), but an image forming process of forming a toner image is not executed.

In other words, in the monochrome image forming mode, the photosensitive drum 1K of the image forming portion that forms a toner image and the photosensitive drums 1Y, 1M, and 1C of the image forming portions that do not form a toner image are driven (rotated), and a toner image is formed only on the photosensitive drum 1K of the image forming portion UK of color K.

Note that the image forming mode for forming an image on the recording material by driving the photosensitive drum of the image forming portion that forms a toner image and the photosensitive drum of the image forming portion that does not form a toner image is not limited to the monochrome image forming mode (single-color image forming mode). For example, the color image forming mode may be a secondary color image forming mode in which toner images are formed on the photosensitive drums of two image forming portions among the plurality of image forming portions UY, UM, UC, and UK. Also in this secondary color image forming mode, similarly to the single-color image forming mode, in the image forming portion that does not form a toner image, the photosensitive drum comes into contact with the intermediate transfer member and is rotationally driven (idle rotation), but an image forming process of forming a toner image is not executed.

Then, the toner image formed on the intermediate transfer member 8 is transferred to the recording material P by a secondary transfer roller 13 and a secondary transfer outer roller 14. The toner remaining on the intermediate transfer member 8 without being transferred to the recording material P is removed by an intermediate transfer member cleaner 9.

The recording material P to which the toner image has been transferred last is pressurized and heated by the fixing device 15 including fixing rollers 16 and 17 to obtain a permanent image. The toner remaining on the photosensitive drum 1 after the primary transfer is removed by the cleaner 6 (6Y, 6M, 6C, 6K), and then an LED 7 (7Y, 7M, 7C, 7K) is turned on to reduce the potential unevenness occurring at the time of forming the toner image, thereby preparing for the formation of the next toner image. In addition, the developing method, the transfer method, the cleaning method, and the fixing method are not limited to the above methods.

<Outline of Charging Device>

The charging device 2 is a charging portion that uniformly charges the surface of the photosensitive drum 1 to a desired polarity and potential. The charging device 2 of the present embodiment employs a corona charger arranged to face the photosensitive drum 1 in anon-contact manner. The charging device 2 charges the photosensitive drum 1 with a plurality of corona chargers arranged adjacent to each other in the rotation direction of the photosensitive drum 1. The charging devices 2 included in the image forming portions U have the same configuration. The charging device 2 in the present embodiment will be described with reference to FIG. 2.

Figure 2:
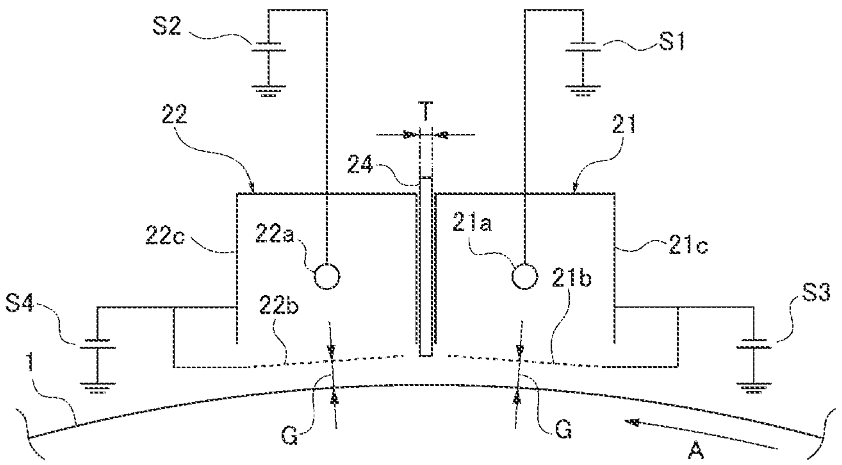
FIG. 2 is a schematic diagram of a charging device and a power source for the charging device in a first embodiment.

FIG. 2 is a schematic diagram of a power source applied to each component of the charging device 2 and the charging device 2 in the present embodiment.

<Configuration of Charging Device>

The charging device 2 includes two corona chargers, an upstream corona charger 21 disposed on the upstream side in the rotation direction (direction of arrow A) of the photosensitive drum 1 and a downstream corona charger 22 disposed on the downstream side. The charging device 2 further includes an insulating member 24 disposed between the upstream corona charger 21 and the downstream corona charger 22.

Here, a configuration in which the charging device 2 includes two corona chargers 21 and 22 as a plurality of corona chargers arranged adjacent to each other in the rotation direction of the photosensitive drum 1 has been exemplified, but the present invention is not limited thereto.

The upstream corona charger 21 is a first corona charger that is disposed at the most upstream position in the rotation direction of the photosensitive drum 1 and performs charging processing on the photosensitive drum 1 at a first position. The downstream corona charger 22 is a second corona charger that is disposed at the most downstream position in the rotation direction of the photosensitive drum 1 and performs charging processing on the photosensitive drum 1 at a second position adjacent to the first position on the downstream side in the rotation direction of the photosensitive drum 1.

Each of the corona chargers 21 and 22 includes a discharge electrode that generates charge by discharge, a grid electrode that adjusts an amount of charge to reach the photosensitive drum, and a shield electrode that is disposed so as to surround the discharge electrode so that the charge does not leak out in the direction of the photosensitive drum. That is, the upstream corona charger 21 as the first corona charger includes a first discharge electrode 21*a*, a first grid electrode 21*b*, and a first shield electrode 21*c*. The downstream corona charger 22, which is a second corona charger, includes a second discharge electrode 22*a*, a second grid electrode 22*b*, and a second shield electrode 22*c*.

The discharge electrodes 21*a* and 22*a* are formed of a conductive wire material linearly arranged along the longitudinal direction (rotational axis direction) of the photosensitive drum 1. The member used for the discharge electrode may be formed of a resin-coated wire, a plate-shaped metal plate, or the like, and may be any member that performs discharge. In the present embodiment, the discharge electrode is formed of a tungsten wire after oxidation treatment having a wire diameter (outer diameter) of 60 μm.

Shapes of the grid electrodes 21*b* and 22*b* will be described. The grid electrodes 21*b* and 22*b* are formed of a conductive flat plate member having a plurality of openings. In the present embodiment, the grid electrodes 21*b* and 22*b* are formed of a stainless steel (SUS) plate, and a corrosion preventing layer such as nickel plating is formed on the surface. In addition, the grid electrode 21*b* of the upstream corona charger 21 has an aperture ratio of 90%, and the grid electrode 22*b* of the downstream corona charger 22 has an aperture ratio of 80%, and each has an etched mesh shape. The aperture ratios of the grid electrodes 21*b* and 22*b* do not need to be different between the upstream corona charger 21 and the downstream corona charger 22, and grid electrodes having the same aperture ratio may be used.

Note that the larger the aperture ratio of the grid electrode, the wider the width (mesh width) of the opening forming the grid electrode, and more charge can be sent to the photosensitive drum. However, the larger the aperture ratio of the grid electrode is, the more difficult it is to control the charge sent to the photosensitive drum. Therefore, in order to control a necessary amount of charge as desired, that is, in order to control the surface potential of the photosensitive drum to a desired value (target potential), it is desirable to use grid electrodes having different aperture ratios.

Next, arrangement positions of the grid electrodes 21*b* and 22*b* will be described. The grid electrode 21*b* is disposed between the discharge electrode 21*a* and the surface of the photosensitive drum 1 while changing an angle (inclination angle) along the curvature of the photosensitive drum 1 along the longitudinal direction, and the disposition angle is perpendicular to a straight line connecting the discharge electrode 21*a* and the rotation center of the photosensitive drum 1. The grid electrode 22*b* is disposed between the discharge electrode 22*a* and the surface of the photosensitive drum 1 while changing an angle (inclination angle) along the curvature of the photosensitive drum 1 along the longitudinal direction, and the disposition angle is perpendicular to a straight line connecting the discharge electrode 22*a* and the rotation center of the photosensitive drum 1. The grid electrodes 21*b* and 22*b* are disposed such that the closest distance G to the photosensitive drum 1 is 1.25±0.2 mm.

As illustrated in FIG. 2, the shield electrodes 21*c* and 22*c* are formed so as to surround the discharge electrodes 21*a* and 22_a_, respectively, and are formed of a conductive substantially box-shaped member having an opening in which the grid electrodes 21_b_ and 22_b_ are arranged on a side facing the photosensitive drum 1.

The insulating member 24 is disposed between the shield electrode 21_c_ of the upstream corona charger 21 and the shield electrode 22_c_ of the downstream corona charger 22, and prevents occurrence of leakage when different voltages are applied between the shields. In the present embodiment, an insulating plate formed of an electrically insulating material having a thickness T of about 2 mm is used as the insulating member 24.

<Voltage Application Configuration of Charging Device>

As shown in FIG. 2, the first discharge electrode 21_a_ is connected to a first discharge electrode power source (first current application portion) S1 that applies a current (discharge current) to the first discharge electrode 21_a_. The second discharge electrode 22_a_ is connected to a second discharge electrode power source (second current application portion) S2 that applies a current (discharge current) to the second discharge electrode 22_a_. The first grid electrode 21_b_ is connected to a first grid electrode power source (first voltage application portion) S3 that applies a voltage (grid voltage) to the first grid electrode 21_b_. The second grid electrode 22_b_ is connected to a second grid electrode power source (second voltage application portion) S4 that applies a voltage (grid voltage) to the second grid electrode 22_b_. The shield electrode 21_c_ is connected to the first grid electrode power source S3 so as to have the same potential as the grid electrode 21_b_. The shield electrode 22_c_ is connected to the second grid electrode power source S4 so as to have the same potential as the grid electrode 22_b_.

Figure 3:
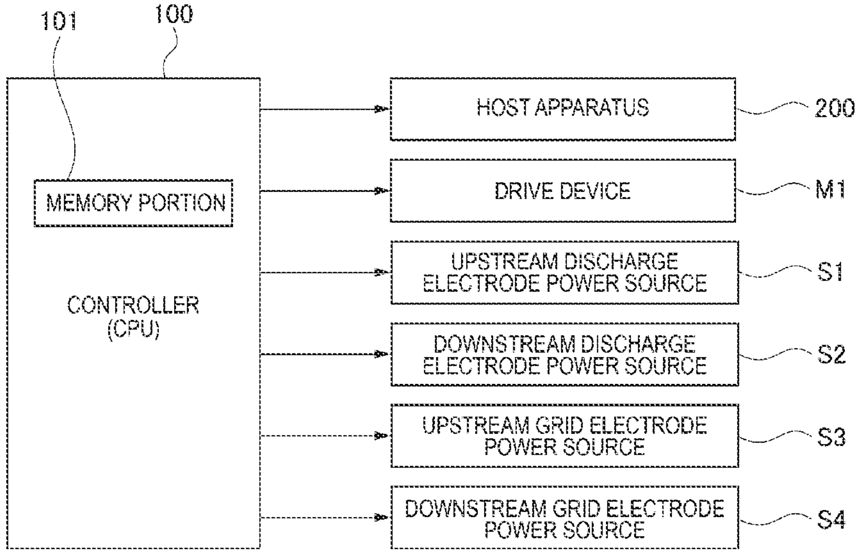
FIG. 3 is a block diagram of a control system according to the first embodiment.

In the present embodiment, as shown in FIG. 3, the discharge electrode power sources S1 and S2 that apply a discharge current to the discharge electrodes 21_a_ and 22_a_ are independently controlled by a controller (CPU) 100, and can apply a constant current in a range of 0 to −1500 μA. The controller (CPU) 100 controls an amount of negative charge generated by each discharge electrode by controlling an amount of discharge current applied to each discharge electrode. The discharge electrode power source may apply a constant voltage. The voltage applied to the discharge electrode may be controlled to be constant. The discharge electrode power sources S1 and S2 may be shared, and a discharge current may be applied to the plurality of discharge electrodes 21_a_ and 22_a_ from the same discharge electrode power source.

As illustrated in FIG. 3, the grid electrode power sources S3 and S4 for applying grid voltages to the grid electrodes 21_b_ and 22_b_ are also independently controlled by the controller (CPU) 100, and can apply a constant voltage in the range of 0 to −1500 V. The controller (CPU) 100 controls each grid voltage applied to each grid electrode to control the amount of negative charge to be caused to reach the surface of the photosensitive drum 1. The amount of negative charge (movement of negative charge) to reach the surface of the photosensitive drum 1 is determined by an electric field due to a potential difference between a surface potential of the photosensitive drum 1 and a grid voltage.

Therefore, by setting the set value of the grid voltage high (for example, −800 V), the amount of negative charge reaching the photosensitive drum 1 increases and the surface potential of the photosensitive drum 1 increases as compared with the case where the set value of the grid voltage is set low (for example, −500 V).

<Outline of Photosensitive Drum>

In the present embodiment, the photosensitive drum 1 is a negatively charged organic photosensitive drum (OPC) having a length of 360 mm in an axial direction and an outer diameter of 84 mm. In the photosensitive drum 1, a photosensitive layer including a photosensitive layer containing an organic photoconductor as a main component is formed on a drum-type conductive substrate. The OPC is generally configured by laminating a charge generation layer formed of an organic material, a charge transport layer, and a surface protective layer on a metal substrate as a conductive substrate. In the present example, each layer is formed using a material described in Japanese Patent Laid-Open No. 2005-43806 A. In the present embodiment, as illustrated in FIG. 3, the photosensitive drum 1 in the image forming portion U of each color is rotationally driven at a process speed (circumferential velocity) of normally 500 mm/s by a drive device M1 controlled by the controller (CPU) 100.

<Outline of Intermediate Transfer Member>

In the present embodiment, an endless belt member having flexibility is used as the intermediate transfer member 8. In the intermediate transfer member 8, a rubber layer containing an appropriate amount of carbon black as an antistatic agent is formed to have a thickness of 0.05 to 0.5 mm on a substrate having a thickness of 0.07 to 0.2 mm and formed of a resin such as polyimide or polycarbonate. Further, the surface is coated with a material containing a fluororesin or the like in a thickness of 5 to 30 m. As a result, the intermediate transfer member 8 having a volume resistivity of $1\times10^{9}$ to $1\times10^{14}$ Ω·cm and a thickness of 0.07 to 0.3 mm is used.

In addition, the intermediate transfer member 8 in the present embodiment is driven at a speed of 102% with respect to the photosensitive drum 1. During driving, the primary transfer roller 5 is in contact with all the photosensitive drums 1 at a predetermined pressure, and contact charging occurs due to sliding with the photosensitive drums 1.

<Outline of Control System>

FIG. 3 is a block diagram of a control system. The controller (CPU) 100 is a control circuit portion including, for example, a microcomputer as a main control circuit. The controller (CPU) 100 exchanges various electrical information signals with a host apparatus 200 such as an image reader, a host computer, a network, or a facsimile. In addition, the controller 100 performs processing of electrical information signals input from various process devices and sensors of the image forming portion, processing of command signals to various process devices, predetermined initial sequence control, predetermined image forming sequence control, and the like. The controller 100 executes predetermined control according to a control program and a reference table stored in a memory portion 101.

The controller (CPU) 100 independently controls ON/OFF of outputs of the discharge electrode power sources S1 and S2 and the grid electrode power sources S3 and S4 and output values thereof.

<Outline of Charging Processing Method of First Embodiment>

The image forming apparatus according to the present embodiment can form an image on a recording material in a full-color image forming mode or a monochrome image forming mode. In the full-color image forming mode, toner images are formed on the photosensitive drums 1 of all the image forming portions U. On the other hand, in the monochrome image forming mode, the toner image is formed only on the photosensitive drum 1K of the image forming portion UK of color K, but the photosensitive drum 1 of the image forming portion U that does not form the toner image is also driven. That is, in the monochrome image forming mode, the image forming portion Ut that forms a toner image on the photosensitive drum 1 and the image forming portion Un that does not form a toner image on the photosensitive drum 1 are driven in a mixed manner. This is because the image forming apparatus according to the present embodiment is disposed such that the photosensitive drums 1 of all the image forming portions U are in contact with the intermediate transfer member 8 when any of the plurality of image forming portions forms a toner image on the photosensitive drum 1.

Figure 4:
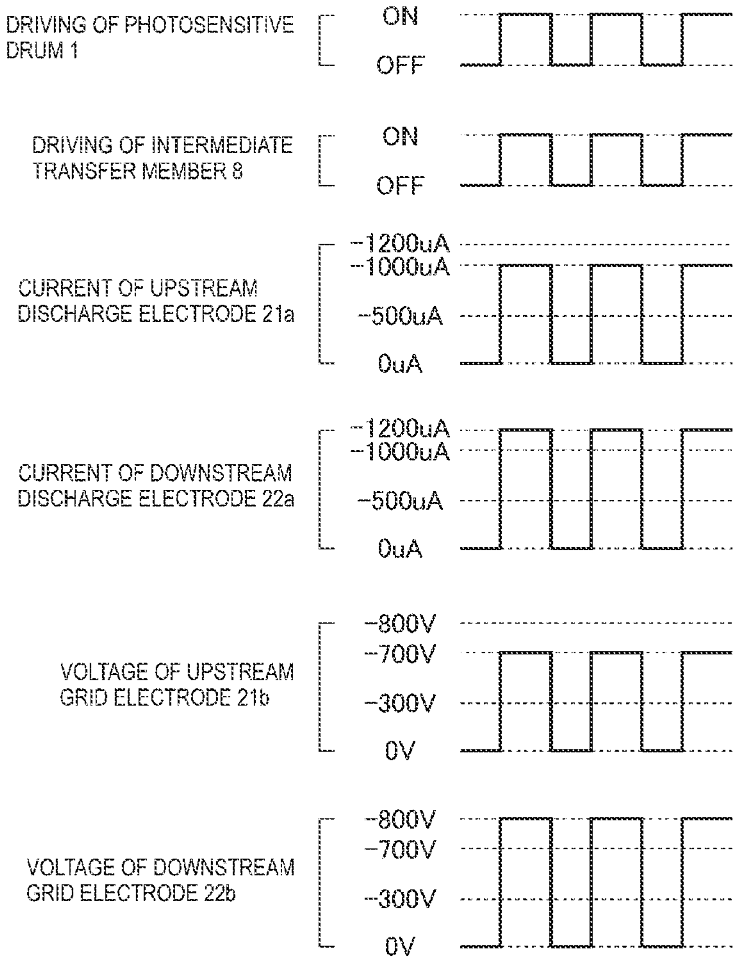
FIG. 4 is a control chart of an image forming portion Ut that forms a toner image according to the first embodiment.
Figure 5:
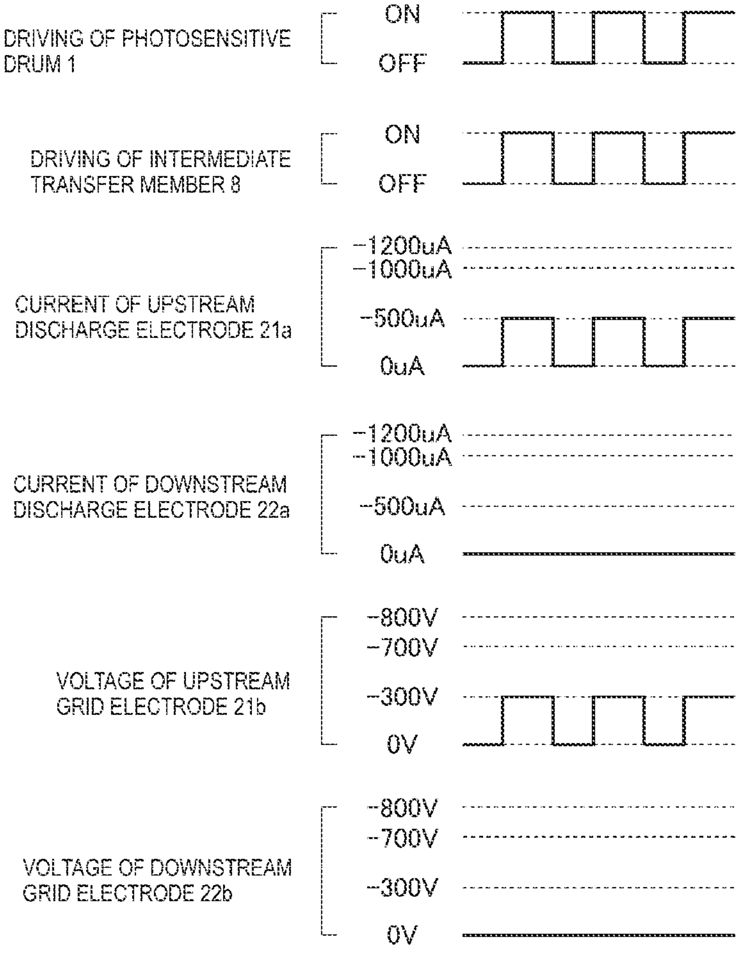
FIG. 5 is a control chart of an image forming portion Un that does not form a toner image in the first embodiment.

The charging processing control of the photosensitive drum 1 of the image forming portion U in each image forming mode will be described with reference to FIGS. 4 and 5. FIG. 4 is a control chart of the driving of the photosensitive drum 1 and the intermediate transfer member 8 in the image forming portion Ut and the high voltage of the charging device 2. FIG. 5 is a control chart of driving of the photosensitive drum 1 and the intermediate transfer member 8 in the image forming portion Un and the high voltage of the charging device 2. First, charging processing control in the full-color image forming mode will be described with reference to FIG. 4, and next, charging processing control in the monochrome image forming mode will be described with reference to FIGS. 4 and 5.

<Full-Color Image Forming Mode>

In the full-color image forming mode, the photosensitive drums 1Y, 1M, 1C, and 1K of all the image forming portions UY, UM, UC, and UK are driven (rotated) to form toner images of the colors of Y, M, C, and K on the surfaces of the photosensitive drums 1 of all the image forming portions U. In the full-color image forming mode, all the image forming portions UY, UM, UC, and UK are the image forming portions Ut that form a toner image, and there is no image forming portion Un that does not form a toner image. Therefore, the charging processing control of the image forming portion Ut in the full-color image forming mode is performed on all the image forming portions UY, UM, UC, and UK, which are the image forming portions Ut that form a toner image.

<Charging Processing Control of Image Forming Portion Ut Forming Toner Image>

The driving of the photosensitive drum 1 and the intermediate transfer member 8 in the image forming portion Ut and the control of the high voltage of the charging device 2 will be described with reference to FIG. 4. In the charging device 2 employed in the present embodiment, the charging processing is sequentially performed by the upstream corona charger 21 and the downstream corona charger 22 so that the potential (charging potential) of the surface of the rotating photosensitive drum 1 becomes a desired value (target potential), and the surface potential of the photosensitive drum 1 is formed in a superimposed (synthesized) manner.

In the present embodiment, the target potential of the surface of the photosensitive drum 1 of the image forming portion Ut that forms a toner image is set to −700V. At this time, −1000 μA is applied to the discharge electrode 21*a* of the upstream corona charger 21, −1200 μA is applied to the discharge electrode 22*a* of the downstream corona charger 22, −700 V is applied to the grid electrode 21*b* of the upstream corona charger 21, and −800 V is applied to the grid electrode 22*b* of the downstream corona charger 22. In other words, a voltage equal to or lower than the absolute value of the target potential of the surface of the photosensitive drum 1 of the image forming portion Ut is applied to the grid electrode 21*b* other than the most downstream grid electrode among the plurality of grid electrodes of each image forming portion Ut. The set value of the voltage applied to these grid electrodes is an example in the present embodiment, and varies depending on the configuration of the charger, and thus is not necessarily limited to the conditions described above. In addition, a voltage larger than the absolute value of the target potential of the surface of the photosensitive drum 1 of the image forming portion Ut is applied to the most downstream grid electrode 22*b*. As a result, the target potential of the surface of the photosensitive drum 1 is established.

Here, the absolute value of the grid voltage (−800 V) applied to the grid electrode 22*b* is larger than the absolute value of the target potential (−700 V) of the photosensitive drum 1. This is because the space between the grid electrode 22*b* and the surface of the photosensitive drum 1 becomes resistance, and the grid electrode 22*b* and the surface of the photosensitive drum 1 do not necessarily have the same potential.

The current (−1200 μA) applied to the discharge electrode 22*a* of the downstream corona charger 22 is larger than the current (−1000 μA) applied to the discharge electrode 21*a* of the upstream corona charger 21. Furthermore, in the present embodiment, as described above, the aperture ratio (80%) of the grid electrode 22*b* of the downstream corona charger 22 is made smaller than the aperture ratio (90%) of the grid electrode 21*b* of the upstream corona charger 21. This is because the upstream corona charger 21 plays a role of securing the amount of charge on the surface of the photosensitive drum 1, whereas the downstream corona charger 22 plays a role of suppressing charging unevenness on the surface of the photosensitive drum 1.

The larger the current applied to the discharge electrode, the more the effect of suppressing the charging unevenness of the surface of the photosensitive drum 1 is enhanced. Therefore, the current applied to the discharge electrode 22*a* of the downstream corona charger 22 is made larger than the current applied to the discharge electrode 21*a* of the upstream corona charger 21. On the other hand, the larger the current applied to the discharge electrode, the more likely the deterioration of the grid electrode progresses. That is, the grid electrode 22*b* of the downstream corona charger 22 is more likely to deteriorate than the grid electrode 21*b* of the upstream corona charger 21. For this reason, deterioration of the grid electrode 22*b* of the downstream corona charger 22 located most downstream in the rotation direction of the photosensitive drum 1 can be a rate-limiting factor of the service life of the charging device 2 including the plurality of corona chargers.

In the present embodiment, when the surface of the photosensitive drum 1 of the image forming portion Un that does not form a toner image is weakly charged, shortening of the service life of the charging device 2 including a plurality of corona chargers is suppressed. Details thereof will be described below.

<Monochrome Image Forming Mode>

On the other hand, in the monochrome image forming mode, the toner image of the color K is formed only on the surface of the photosensitive drum 1K of the image forming portion UK of the color K among the plurality of image forming portions, and the toner image is not formed on the photosensitive drums of the other image forming portions except for the image forming portion UK of the color K. However, the photosensitive drums 1Y, 1M, and 1C of the image forming portions UY, UM, and UC that do not form a toner image are also rotationally driven (idle rotation) in contact with the intermediate transfer member 8. That is, in the monochrome image forming mode, not only the photosensitive drum 1K of the image forming portion UK that forms a toner image but also the photosensitive drums 1Y, 1M, and 1C of the image forming portions UY, UM, and UC that do not form a toner image are rotationally driven (idle rotation). However, an image forming process of forming a toner image only on the photosensitive drum 1K of the image forming portion UK for color K is executed.

In other words, in the monochrome image forming mode (single-color image forming mode), the image forming portion Ut that forms a toner image on the photosensitive drum 1 and the image forming portion Un that does not form a toner image on the photosensitive drum 1 are driven in a mixed manner. The charging processing control of each photosensitive drum 1 of the image forming portion Ut and the image forming portion Un in the monochrome image forming mode will be described.

<1) Charging Processing Control of Image Forming Portion Ut Forming Toner Image>

The driving of the photosensitive drum 1 and the intermediate transfer member 8 in the image forming portion Ut and the control of the high voltage of the charging device 2 will be described with reference to FIG. 4. The charging processing control of the image forming portion Ut in the monochrome image forming mode is performed on the image forming portion UK of color K, which is the image forming portion Ut that forms a toner image.

Note that the charging processing control of the image forming portion Ut in the monochrome image forming mode is the same as the charging processing control of the image forming portion Ut in the full-color image forming mode described with reference to FIG. 4, and thus the description thereof will be omitted here.

<2) Charging Processing Control of Image Forming Portion Un That Does Not Form Toner Image>

Next, the driving of the photosensitive drum 1 and the intermediate transfer member 8 in the image forming portion Un and the control of the high voltage of the charging device 2 will be described with reference to FIG. 5. The charging processing control of the image forming portion Un in the monochrome image forming mode is performed on the image forming portions UY, UM, and UC of Y, M, and C colors, which are the image forming portions Un that do not form a toner image.

As described in the related art, it is important that the photosensitive drum 1 of the image forming portion Un that does not form a toner image is not charged so that the surface potential does not have a polarity opposite to the polarity charged when forming a toner image. Therefore, if the photosensitive drum 1 of the image forming portion Un that does not form a toner image is charged with the same polarity as when the photosensitive drum 1 forms a toner image, charging unevenness and the like do not need to be considered.

In the charging device 2 including the plurality of corona chargers employed in the present embodiment, the downstream corona charger 22 located most downstream in the rotation direction of the photosensitive drum 1 plays a role of reducing charging unevenness including the charging unevenness occurring due to the charging processing of the upstream corona charger 21. Therefore, the charging unevenness occurring when the grid electrode 21*b* in the upstream corona charger 21 is deteriorated can be canceled by the downstream corona charger 22.

The absolute value of the target potential of the surface of the photosensitive drum 1 of the image forming portion Un that does not form a toner image is set to a value lower than the absolute value of the target potential of the surface of the photosensitive drum 1 of the image forming portion Ut that forms a toner image. In the present embodiment, the target potential of the surface of the photosensitive drum 1 of the image forming portion Un that does not form a toner image is set to −250 V. At this time, −500 μA is applied to the discharge electrode 21*a* of the upstream corona charger 21, and −300 V is applied to the grid electrode 21*b*. However, no current is applied to the discharge electrode 22*a* of the downstream corona charger 22, and no voltage is applied to the grid electrode 22*b*.

In the present embodiment, in the monochrome image forming mode, the rotational driving of the developing sleeve 4*a* of the image forming portion Un that does not form a toner image is turned off. In the present embodiment, in the monochrome image forming mode, the target potential of the surface of the photosensitive drum 1 of the image forming portion Un that does not form a toner image is set to −250 V. On the other hand, in the present embodiment, in the monochrome image forming mode, the developing bias applied to the developing sleeve 4*a* of the image forming portion Un that does not form a toner image is set to −175V. In the present embodiment, in the monochrome image forming mode, the transfer bias applied to the primary transfer roller 5 of the image forming portion Un that does not form a toner image is set to −600 V.

That is, in the monochrome image forming mode, the controller 100 executes control to independently apply the following first voltage (absolute value) and second voltage (absolute value) to the plurality of grid electrodes 21*b* and 22*b* of the image forming portion Un that does not form a toner image.

The controller 100 applies a first voltage (−300 V in this case) larger than the absolute value of the target potential (−250 V in this case) of the surface of the photosensitive drum 1 of the image forming portion Un to the grid electrode 21*b* of the image forming portion Un. Furthermore, the first voltage applied to the grid electrode 21*b* of the image forming portion Un is a value smaller than a minimum value of absolute values of a plurality of voltages (here, −700 V and −800 V) applied to the plurality of grid electrodes 21*b* and 22*b* of the image forming portion Ut that forms a toner image.

The controller 100 applies a second voltage (here, 0 V) smaller than the absolute value of the target potential (here, −250 V) of the surface of the photosensitive drum 1 of the image forming portion Un to the grid electrodes 21*b* other than the grid electrode 22*b* to which the first voltage is applied. Here, the controller 100 does not apply a voltage to the grid electrode 21*b* other than the grid electrode 22*b* to which the first voltage is applied. As a result, deterioration of the grid electrode can be suppressed as compared with the grid electrode to which a voltage higher than the second voltage is applied.

However, the second voltage applied to the grid electrodes 21*b* other than the grid electrode 22*b* to which the first voltage is applied is not limited to 0 V described above. As the second voltage applied to the grid electrode 22*b* of the downstream corona charger 22, a value lower than the target potential of the surface of the photosensitive drum 1 of the image forming portion Un may be applied.

In addition, the controller 100 applies the second voltage to the second grid electrode 21*b* on the most downstream side in the rotation direction of the photosensitive drum 1 among the plurality of grid electrodes 22*b* and 22*b* of the image forming portion Un that does not form a toner image.

Then, the first voltage is applied to the first grid electrode 22*b* which is any one of the grid electrodes other than the most downstream second grid electrode 21*b*. This is because, in the charging device 2 including the plurality of corona chargers 21 and 22, the downstream corona charger 22 located most downstream in the rotation direction of the photosensitive drum 1 plays a role of reducing charging unevenness including the charging unevenness occurring due to the charging processing of the upstream corona charger 21. By executing this charging processing control, it is possible to further suppress deterioration of the most downstream second grid electrode 22*b* as compared with grid electrodes other than the most downstream second grid electrode.

As described above, the deterioration of the grid electrode 22*b* of the downstream corona charger 22 on the most downstream side in the rotation direction of the photosensitive drum 1 can be the rate-limiting factor of the service life of the charging device 2 including the plurality of corona chargers. On the other hand, in the first embodiment, deterioration of the grid electrode 22*b* of the downstream corona charger 22 located most downstream in the rotation direction of the photosensitive drum 1 of the image forming portion Un that does not form a toner image is suppressed. Therefore, in the first embodiment, it is possible to suppress shortening of the service life of the charging device 2 including the plurality of corona chargers.

<Effects of First Embodiment>

The technique described in the present embodiment is to solve a problem that, when the surface of the photosensitive drum 1 of the image forming portion Un that does not form a toner image is charged, occurrence of charging unevenness due to deterioration of the grid electrodes 21*b* and 22*b* constituting the charging device 2 causes image unevenness. The present inventors confirmed the effect of the charging processing control described above by the following method. Using the image forming apparatus illustrated in FIG. 1, an all-color image (Y, M, C, K) and a single-color image (K) were switchably and continuously formed on the recording material P at constant intervals, with the same conditions of the environment and the image ratio. Then, the presence or absence of image unevenness of the image forming portion Un (Y, M, C) that does not form a toner image when forming a single-color image was appropriately checked. The presence or absence of the image unevenness was determined based on the quality standard of the image forming apparatus. The environment was set to normal temperature and normal humidity (23° C. and 50% RH), and the image ratio was set to 50% for easy understanding of the occurrence of image unevenness.

In a comparative example, in the image forming portion Un that does not form a toner image, not only the first voltage is applied to the grid electrode 21*b* of the upstream corona charger 21, but also the same first voltage as the grid electrode 21*b* is applied to the grid electrode 22*b* of the downstream corona charger 22. In the case of this comparative example, image unevenness occurred in about 1 million sheets.

On the other hand, in the present embodiment, the first voltage is applied to the grid electrode 21*b* of the upstream corona charger 21, and the second voltage is applied to the grid electrode 22*b* of the downstream corona charger 22 in the image forming portion Un that does not form a toner image. Specifically, the first voltage was applied to the grid electrode 21*b* of the upstream corona charger 21, and no voltage was applied to the grid electrode 22*b* of the downstream corona charger 22. In the case of the present embodiment, image unevenness did not occur in about 1.25 million sheets.

From this result, it was possible to confirm the effect of suppressing the occurrence of image unevenness by performing control to apply the grid voltage only to the grid electrode 21*b* of the upstream corona charger 21 in the charging processing of the image forming portion Un. That is, it was possible to confirm the effect of suppressing the deterioration of the grid electrode.

As described above, according to the present embodiment, it is possible to suppress deterioration of the grid electrode of the image forming portion Un that does not form a toner image, and it is possible to prevent occurrence of image unevenness while eliminating charging unevenness due to deterioration of the grid electrode.

In addition, the technique described in the present embodiment can be applied to an image forming apparatus including a plurality of image forming portions U and having a configuration in which the photosensitive drums 1 of all the image forming portions U are in contact with the intermediate transfer member 8 when any of the plurality of image forming portions U forms a toner image. In this image forming apparatus, the above-described effect can be exhibited when the image forming portion Ut that forms a toner image on the photosensitive drum 1 and the image forming portion Un that does not form a toner image are driven in a mixed manner. Note that the degree of effect varies depending on the number of times (drive times) the image forming portion Ut and the image forming portion Un are driven in a mixed manner.

Second Embodiment

Figure 6:
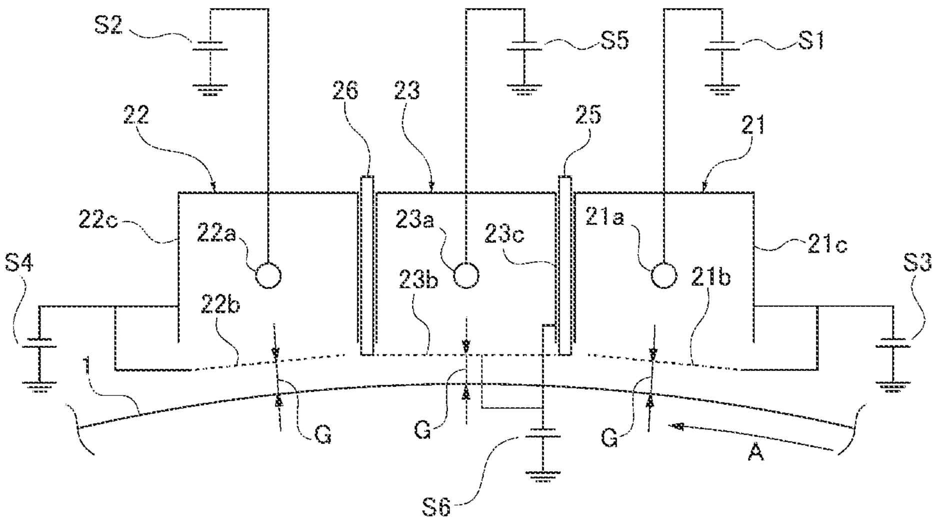
FIG. 6 is a schematic diagram of a charging device and a power source for the charging device in a second embodiment.

The charging device 2 in the present embodiment will be described with reference to FIG. 6. FIG. 6 is a schematic diagram of a power source applied to each component of the charging device 2 and the charging device 2 in the present embodiment. The charging device 2 in the present embodiment is different from the charging device 2 in the above-described embodiment in the number of corona chargers constituting the charging device 2.

Although the charging device 2 in the present embodiment has a configuration including three corona chargers as a configuration including a plurality of corona chargers, the number of corona chargers is not limited thereto.

<Configuration of Charging Device in Second Embodiment>

The charging device 2 includes an upstream corona charger 21 disposed at a most upstream position in the rotation direction (direction of arrow A) of the photosensitive drum 1 and a downstream corona charger 22 disposed at a most downstream position.

The charging device 2 further includes an intermediate corona charger 23 disposed between the upstream corona charger 21 and the downstream corona charger 22 in the rotation direction of the photosensitive drum 1.

The upstream corona charger 21 is a first corona charger that charges the photosensitive drum 1 at a first position. The downstream corona charger 22 is a second corona charger that charges the photosensitive drum 1 at a second position downstream of the first position in the rotation direction of the photosensitive drum 1. The intermediate corona charger 23 is a third corona charger that charges the photosensitive drum 1 at a third position between the first position and the second position.

In other words, the intermediate corona charger 23 charges the photosensitive drum 1 at a third position adjacent to the first position on the downstream side in the rotation direction of the photosensitive drum 1. The downstream corona charger 22 charges the photosensitive drum 1 at a second position adjacent to the third position on the downstream side in the rotation direction of the photosensitive drum 1.

In the charging device 2, the insulating member 25 is disposed between the adjacent upstream corona charger 21 and intermediate corona charger 23, and the insulating member 26 is disposed between the adjacent downstream corona charger 22 and intermediate corona charger 23.

The configurations of the upstream corona charger 21 and the downstream corona charger 22 are the same as the configurations of the upstream corona charger 21 and the downstream corona charger 22 of the first embodiment described above.

As illustrated in FIG. 6, the intermediate corona charger 23 includes a third discharge electrode 23*a*, a third grid electrode 23*b*, and a third shield electrode 23*c*. The material, shape, and arrangement of each electrode of the intermediate corona charger 23 are configured in the same manner as those of the upstream corona charger 21 and the downstream corona charger 22. In the present embodiment, the aperture ratio of the grid electrode 23*b* of the intermediate corona charger 23 is 80%. The aperture ratio (80%) of the grid electrode 23*b* of the intermediate corona charger 23 is not necessarily different from the aperture ratio (90%) of the grid electrode 21*b* of the upstream corona charger 21, and the same aperture ratio may be used. The aperture ratio (80%) of the grid electrode 23*b* of the intermediate corona charger 23 is not necessarily the same as the aperture ratio (80%) of the grid electrode 22*b* of the downstream corona charger 22, and a different aperture ratio may be used. The aperture ratios of the grid electrodes 21*b*, 22*b*, and 23*b* do not need to be different among the upstream corona charger 21, the downstream corona charger 22, and the intermediate corona charger 23, and grid electrodes having the same aperture ratio may be used.

As the insulating members 25 and 26, those having the same material and shape as those of the insulating member 24 (see FIG. 2) of the first embodiment described above were used.

<Voltage Application Configuration of Charging Device>

The voltage application configurations of the upstream corona charger 21 and the downstream corona charger 22 are as illustrated in FIG. 6, and are the same as the voltage application configurations of the upstream corona charger 21 and the downstream corona charger 22 of the first embodiment described above.

The voltage application configuration of the intermediate corona charger 23 is as illustrated in FIG. 6. The discharge electrode 23*a* of the intermediate corona charger 23 is connected to a third discharge electrode power source (third current application portion) S5 that applies a current to the discharge electrode 23*a*. The grid electrode 23*b* and the shield electrode 23*c* of the intermediate corona charger 23 are connected to a third grid electrode power source (third voltage application portion) S6 that applies a voltage to the grid electrode 23*b* and the shield electrode 23*c*.

Figure 7:
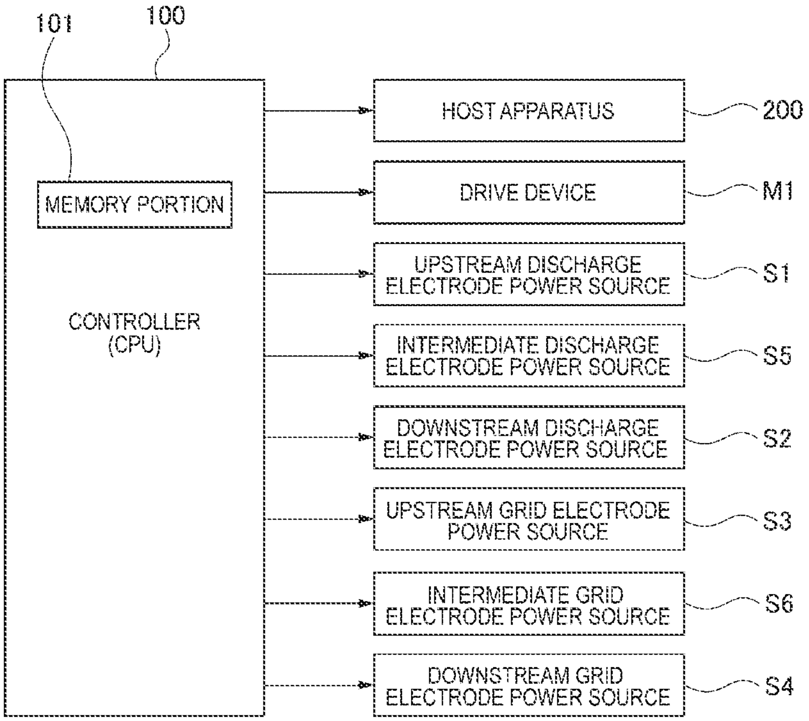
FIG. 7 is a block diagram of a control system in the second embodiment.

The third discharge electrode power source S5 and the third grid electrode power source S6 of the intermediate corona charger 23 are controlled by the controller (CPU) 100, and can perform the same control as the upstream corona charger 21 and the downstream corona charger 22 of the first embodiment. In the present embodiment, as illustrated in FIG. 7, the discharge electrode power source S5 of the intermediate corona charger 23 is configured to be independently controllable with respect to the other discharge electrode power sources S1 and S2, but the discharge electrode power source S5 may be shared with the other discharge electrode power sources S1 and S2. The grid electrode power source S6 of the intermediate corona charger 23 is configured to be independently controllable with respect to the other grid electrode power sources S3 and S4. However, the power source may be shared with the grid electrode power source S3 that applies a voltage to the grid electrode 21*b* of the upstream corona charger 21, which is another corona charger, except for the most downstream corona charger among the plurality of corona chargers included in the charging device 2. This is because the grid electrode power source S4 that applies a voltage to the grid electrode 22*b* of the downstream corona charger 22 on the most downstream side always needs to be controlled independently of the other corona chargers 21 and 23 so as not to deteriorate the grid electrode 22*b* of the downstream corona charger 22.

<Outline of Charging Processing Method of Second Embodiment>

Similarly to the first embodiment described above, the image forming apparatus according to the present embodiment can form an image on a recording material in a full-color image forming mode or a monochrome image forming mode.

Figure 8:
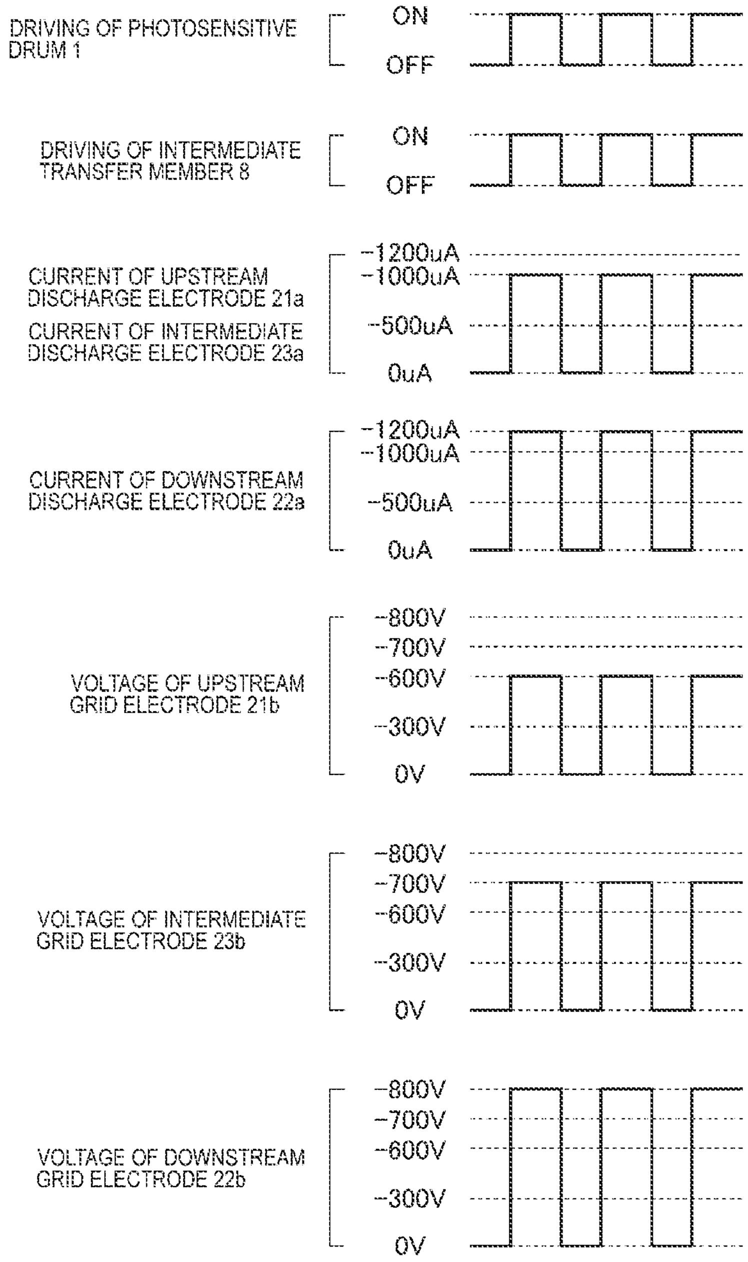
FIG. 8 is a control chart of an image forming portion Ut that forms a toner image in the second embodiment.
Figure 9:
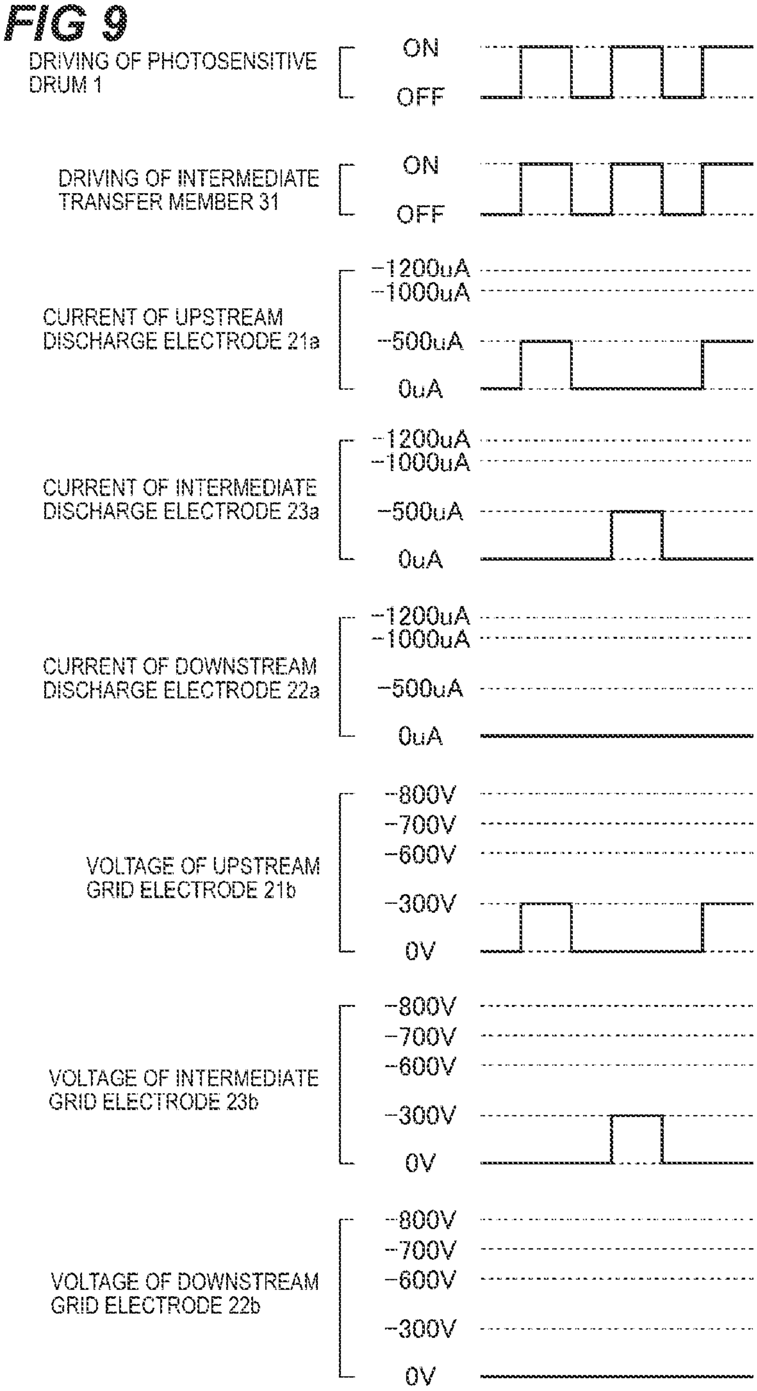
FIG. 9 is a control chart of an image forming portion Un that does not form a toner image in the second embodiment.

The charging processing control of the photosensitive drum 1 of the image forming portion U in each image forming mode will be described with reference to FIGS. 8 and 9. FIG. 8 is a control chart of driving of the photosensitive drum 1 and the intermediate transfer member 8 in the image forming portion Ut in the second embodiment and the high voltage of the charging device 2. FIG. 9 is a control chart of driving of the photosensitive drum 1 and the intermediate transfer member 8 in the image forming portion Un according to the second embodiment and the high voltage of the charging device 2. First, charging processing control in the full-color image forming mode will be described with reference to FIG. 8, and next, charging processing control in the monochrome image forming mode will be described with reference to FIGS. 8 and 9.

<Full-Color Image Forming Mode>

In the full-color image forming mode, the photosensitive drums 1Y, 1M, 1C, and 1K of all the image forming portions UY, UM, UC, and UK are driven (rotated) to form toner images of the colors of Y, M, C, and K on the surfaces of the photosensitive drums 1 of all the image forming portions U. In the full-color image forming mode, all the image forming portions UY, UM, UC, and UK are the image forming portions Ut that form a toner image, and there is no image forming portion Un that does not form a toner image. Therefore, the charging processing control of the image forming portion Ut in the full-color image forming mode is performed on all the image forming portions UY, UM, UC, and UK, which are the image forming portions Ut that form a toner image.

<Charging Processing Control of Image Forming Portion Ut Forming Toner Image>

The driving of the photosensitive drum 1 and the intermediate transfer member 8 in the image forming portion Ut and the control of the high voltage of the charging device 2 will be described with reference to FIG. 8. In the charging device 2 employed in the present embodiment, the charging processing is sequentially performed by the upstream corona charger 21, the intermediate corona charger 23, and the downstream corona charger 22 so that the potential of the surface of the rotating photosensitive drum 1 becomes a desired value (target potential), and the surface potential of the photosensitive drum 1 is formed in a superimposed (synthesized) manner.

In the present embodiment, the target potential of the surface of the photosensitive drum 1 of the image forming portion Ut that forms a toner image is set to −700V. At this time, −1000 μA is applied to the discharge electrode 21*a* of the upstream corona charger 21, the discharge electrode 23*a* of the intermediate corona charger 23, and −1200 μA is applied to the discharge electrode 22*a* of the downstream corona charger 22. In addition, −600 V is applied to the grid electrode 21*b* of the upstream corona charger 21, −700 V is applied to the grid electrode 23*b* of the intermediate corona charger 23, and −800 V is applied to the grid electrode 22*b* of the downstream corona charger 22. In other words, a voltage equal to or lower than the absolute value of the target potential of the surface of the photosensitive drum 1 of the image forming portion Ut is applied to the grid electrodes 21*b* and 23*b* other than the most downstream grid electrode among the plurality of grid electrodes of each image forming portion Ut. The set value of the voltage applied to these grid electrodes is an example in the present embodiment, and varies depending on the configuration of the charger, and thus is not necessarily limited to the conditions described above. In addition, a voltage larger than the absolute value of the target potential of the surface of the photosensitive drum 1 of the image forming portion Ut is applied to the most downstream grid electrode 22*b*. As a result, the target potential of the surface of the photosensitive drum 1 is established.

<Monochrome Image Forming Mode>

On the other hand, in the monochrome image forming mode, the toner image of the color K is formed only on the surface of the photosensitive drum 1K of the image forming portion UK of the color K among the plurality of image forming portions, and the toner image is not formed on the photosensitive drums of the other image forming portions except for the image forming portion UK of the color K. However, the photosensitive drums 1Y, 1M, and 1C of the image forming portions UY, UM, and UC that do not form a toner image are also rotationally driven (idle rotation) in contact with the intermediate transfer member 8. That is, in the monochrome image forming mode, not only the photosensitive drum 1K of the image forming portion UK that forms a toner image but also the photosensitive drums 1Y, 1M, and 1C of the image forming portions UY, UM, and UC that do not form a toner image are rotationally driven (idle rotation). However, an image forming process of forming a toner image only on the photosensitive drum 1K of the image forming portion UK for color K is executed.

In other words, in the monochrome image forming mode (single-color image forming mode), the image forming portion Ut that forms a toner image on the photosensitive drum 1 and the image forming portion Un that does not form a toner image on the photosensitive drum 1 are driven in a mixed manner. The charging processing control of each photosensitive drum 1 of the image forming portion Ut and the image forming portion Un in the monochrome image forming mode will be described.

<1) Charging Processing Control of Image Forming Portion Ut Forming Toner Image>

The driving of the photosensitive drum 1 and the intermediate transfer member 8 in the image forming portion Ut and the control of the high voltage of the charging device 2 will be described with reference to FIG. 8. The charging processing control of the image forming portion Ut in the monochrome image forming mode is performed on the image forming portion UK of color K, which is the image forming portion Ut that forms a toner image.

Note that the charging processing control of the image forming portion Ut in the monochrome image forming mode is the same as the charging processing control of the image forming portion Ut in the full-color image forming mode described with reference to FIG. 8, and thus the description thereof will be omitted here.

<2) Charging Processing Control of Image Forming Portion Un That Does Not Form Toner Image>

Next, the driving of the photosensitive drum 1 and the intermediate transfer member 8 in the image forming portion Un and the control of the high voltage of the charging device 2 will be described with reference to FIG. 9. The charging processing control of the image forming portion Un in the monochrome image forming mode is performed on the image forming portions UY, UM, and UC of Y, M, and C colors, which are the image forming portions Un that do not form a toner image.

As described in the first embodiment, the downstream corona charger 22 located most downstream in the rotation direction of the photosensitive drum 1 determines the final potential of the surface of the photosensitive drum 1 and plays a role of reducing charging unevenness.

The absolute value of the target potential of the surface of the photosensitive drum 1 of the image forming portion Un that does not form a toner image is set to a value lower than the absolute value of the target potential of the surface of the photosensitive drum 1 of the image forming portion Ut that forms a toner image. In the present embodiment, the target potential of the surface of the photosensitive drum 1 of the image forming portion Un that does not form a toner image is set to −250 V.

At this time, as illustrated in FIG. 9, the control is performed while switching the current (voltage) to be applied to the upstream corona charger 21 and the intermediate corona charger 23 which are other corona chargers except the downstream corona charger 22 which is the most downstream corona charger. In this control, when −500 μA is applied to the discharge electrode 21*a* of the upstream corona charger 21 and −300 V is applied to the grid electrode 21*b*, no current is applied to the discharge electrode 23*a* of the intermediate corona charger 23, and no voltage is applied to the grid electrode 23*b*. When −500 μA is applied to the discharge electrode 23*a* of the intermediate corona charger 23 and −300 V is applied to the grid electrode 23*b*, no current is applied to the discharge electrode 21*a* of the upstream corona charger 21, and no voltage is applied to the grid electrode 21*b*.

In other words, the controller 100 performs control while switching the voltage to be applied to the first grid electrode 21*b* or the third grid electrode 23*b* other than the most downstream grid electrode in the rotation direction of the photosensitive drum 1 among the plurality of grid electrodes of the image forming portion Un that does not form a toner image. The controller 100 applies the first voltage to one grid electrode 21*b* (or 23*b*), and applies the second voltage to the other grid electrode 23*b* (or 21*b*).

By this control, the voltage application time of each of the grid electrodes 21*b* and 23*b* is reduced, and deterioration of the grid electrode is suppressed.

Further, −500 μA was applied to either the upstream discharge electrode 21*a* or the intermediate discharge electrode 23*a*, and −300 V was applied to either the upstream grid electrode 21*b* or the intermediate grid electrode 23*b*.

However, no current is applied to the discharge electrode 22*a* of the downstream corona charger 22, which is the most downstream corona charger, and no voltage is applied to the grid electrode 22*b*.

That is, in the monochrome image forming mode, the controller 100 executes control to independently apply the following first voltage (absolute value) and second voltage (absolute value) to the plurality of grid electrodes 21*b*, 22*b*, and 23*b* of the image forming portion Un that does not form a toner image.

The controller 100 applies a first voltage (−300 V in this case) larger than the absolute value of the target potential (−250 V in this case) of the surface of the photosensitive drum 1 of the image forming portion Un to one of the grid electrode 21*b* and the grid electrode 23*b* of the image forming portion Un. Furthermore, the first voltage applied to any one of the grid electrodes 21*b* and 23*b* of the image forming portion Un is a value smaller than a minimum value of absolute values of a plurality of voltages (here, −600 V, −700 V, and −800 V) applied to the plurality of grid electrodes 21*b*, 23*b*, and 22*b* of the image forming portion Ut that forms a toner image.

The controller 100 applies a second voltage (here, 0 V) smaller than the absolute value of the target potential (here, −250 V) of the surface of the photosensitive drum 1 of the image forming portion Un to the other grid electrodes except the grid electrode to which the first voltage is applied. Here, the controller 100 does not apply a voltage to the grid electrodes 21*b* and 23*b* other than the grid electrode 22*b* to which the first voltage is applied. Alternatively, the controller 100 does not apply a voltage to the grid electrodes 23*b* and 21*b* other than the grid electrode 22*b* to which the first voltage is applied. As a result, deterioration of the grid electrode can be suppressed as compared with the grid electrode to which a voltage higher than the second voltage is applied.

However, the second voltage applied to any of the other grid electrodes 21*b* and 23*b* except for any of the grid electrodes 21*b* and 23*b* to which the first voltage is applied and the most downstream grid electrode 22*b* is not limited to 0 V described above. As the second voltage applied to any one of the grid electrodes 21*b* and 23*b* and the grid electrode 22*b* of the downstream corona charger 22, a value lower than the target potential of the surface of the photosensitive drum 1 of the image forming portion Un may be applied as in the first embodiment.

In addition, the controller 100 applies the second voltage to the second grid electrode 21*b* on the most downstream side in the rotation direction of the photosensitive drum 1 among the plurality of grid electrodes 23*b*, 22*b*, 22*b* of the image forming portion Un that does not form a toner image. Then, the first voltage is applied to any one of the first grid electrode 21*b* and the third grid electrode 23*b* other than the most downstream second grid electrode 22*b*. This is because, in the charging device 2 including the plurality of corona chargers 21, 22, and 23, the downstream corona charger 22 located most downstream plays a role of reducing charging unevenness including the charging unevenness occurring due to the charging processing of the upstream corona charger 21 and the intermediate corona charger 23. By executing this charging processing control, deterioration of the grid electrode can be suppressed.

In the present embodiment, as illustrated in FIG. 9, the operation in which the corona charger (discharge electrode and grid electrode) to which the current (voltage) is applied is alternately switched is exemplified. Specifically, the operation in which the upstream corona charger 21 or the intermediate corona charger 23 other than the most downstream corona charger among the plurality of corona chargers 21, 23, and 22 of the image forming portion Un is alternately switched as the corona charger that applies the first voltage has been exemplified. However, the present invention is not limited thereto. For example, it is not necessary to switch every time an image is formed on the recording material, and in the image forming portion Un at the time of image formation of the first and second recording materials, a grid voltage is applied to the grid electrode 21*b* of the upstream corona charger 21, and no voltage is applied to the grid electrode 23*b* of the intermediate corona charger 23. Then, the grid voltage may be applied to the grid electrode 23*b* of the intermediate corona charger 23 in the image forming portion Un at the time of image formation of the third and fourth recording materials. Tat is, the switching operation may be performed so as not to be biased to one of the grid electrodes 21*b* and 23*b* as a whole.

<Effects of Second Embodiment>

The technique described in the present embodiment is to solve a problem that, when the surface of the photosensitive drum 1 of the image forming portion Un that does not form a toner image is charged, occurrence of charging unevenness due to deterioration of the grid electrodes 21*b*, 22*b*, and 23*b* constituting the charging device 2 causes image unevenness. The present inventors confirmed the effect of the charging processing control described above by the following method. Using the image forming apparatus illustrated in FIG. 1, an all-color image (Y, M, C, K) and a single-color image (K) were switchably and continuously formed on the recording material P at constant intervals, with the same conditions of the environment and the image ratio. Then, the presence or absence of image unevenness of the image forming portion Un (Y, M, C) that does not form a toner image when forming a single-color image was appropriately checked. The presence or absence of the image unevenness was determined based on the quality standard of the image forming apparatus. The environment was set to normal temperature and normal humidity (23° C. and 50% RH), and the image ratio was set to 50% for easy understanding of the occurrence of image unevenness.

As described in the first embodiment, when the charging processing of the image forming portion Un was performed only by the upstream corona charger 21 in the charging device 2 including two corona chargers, image unevenness did not occur up to about 1.25 million sheets, but image unevenness occurred thereafter. This is considered to be because the charging unevenness occurring due to the deterioration of the grid electrode 21*b* of the upstream corona charger 21 cannot be canceled by the downstream corona charger 22, and the image unevenness occurs.

On the other hand, in the present embodiment, when the charging processing of the image forming portion Un is performed by the upstream corona charger 21 and the intermediate corona charger 23 in the charging device 2 including three corona chargers, image unevenness did not occur in about 1.25 million sheets, and image unevenness did not occur up to about 1.5 million sheets. This is considered to be because the deterioration of each grid electrode of the upstream corona charger 21 and the intermediate corona charger 23 can be divided.

From this result, it was possible to confirm the effect of suppressing the occurrence of image unevenness by performing control to apply the grid voltage to only the grid electrode of any one of the other corona chargers except the most downstream corona charger in the charging processing of the image forming portion Un. That is, it was possible to confirm the effect of suppressing the deterioration of the grid electrode.

As described above, according to the present embodiment, it is possible to suppress deterioration of the grid electrode of the image forming portion Un that does not form a toner image, and it is possible to prevent occurrence of image unevenness while eliminating charging unevenness due to deterioration of the grid electrode.

In the first and second embodiments described above, the monochrome image forming mode (single-color image forming mode) is exemplified as the image forming mode in which the image forming portion Ut that forms a toner image and the image forming portion Un that does not form a toner image are driven in a mixed manner, but the present invention is not limited thereto. For example, the color image forming mode may be a secondary color image forming mode in which toner images are formed on the photosensitive drums of two image forming portions among the plurality of image forming portions UY, UM, UC, and UK. Also in this secondary color image forming mode, similarly to the single-color image forming mode, in the image forming portion that does not form a toner image, the photosensitive drum comes into contact with the intermediate transfer member and is rotationally driven (idle rotation), but an image forming process of forming a toner image is not executed. In the secondary color image forming mode, the same effect can be obtained by executing the charging processing control described above.

In the first and second embodiments described above, the most downstream corona charger 22 among the plurality of corona chargers of the image forming portion Un is not used as the corona charger to which the first voltage is applied. However, the present invention is not limited to this configuration. The most downstream corona charger 22 of the image forming portion Un may be a corona charger that applies the first voltage. In this case, the second voltage is applied to the other corona chargers. However, as described above, the most downstream corona charger 22 plays a role of reducing the charging unevenness including the charging unevenness occurring due to the charging processing of the corona charger on the upstream side. In addition, as described above, deterioration of the grid electrode 22*b* of the downstream corona charger 22 located most downstream in the rotation direction of the photosensitive drum 1 can be the rate-limiting factor of the service life of the charging device 2 including the plurality of corona chargers. For this reason, it is desirable that the most downstream corona charger 22 is not used as the corona charger to which the first voltage is applied.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-118679, filed Jul. 26, 2022, which is hereby incorporated by reference herein in its entirety.

What is claimed is:

1. An image forming apparatus that forms an image on a recording material, comprising:

a first image forming portion including a rotatable first image bearing member and a first charging device configured to charge the first image bearing member by a plurality of corona chargers including a first corona charger having a first discharge electrode and a first grid electrode and disposed at a most upstream position with respect to a rotation direction of the first image bearing member, and a second corona charger having a second discharge electrode and a second grid electrode and disposed at a most downstream position in the rotation direction of the first image bearing member, the first image forming portion being configured to form a toner image on the first image bearing member;

a second image forming portion including a rotatable second image bearing member and a second charging device configured to charge the second image bearing member by a plurality of corona chargers including a third corona charger having a third discharge electrode and a third grid electrode and disposed at a most upstream position with respect to a rotation direction of the second image bearing member and a fourth corona charger having a fourth discharge electrode and a fourth grid electrode and disposed at a most downstream position in the rotation direction of the second image bearing member, the second image forming portion being configured to form a toner image on the second image bearing member;

an intermediate transfer member which is disposed so as to be in contact with each of the first image bearing member and the second image bearing member and to which the toner image formed on the first image bearing member is transferred; and a controller configured to control each of the first image forming portion and the second image forming portion so that a monochrome image forming mode, in which, in a state in which the intermediate transfer member is in contact with each of the first image bearing member and the second image bearing member and in a state in which each of the first image bearing member and the second image bearing member is rotationally driven, the first image forming portion forms a toner image on the first image bearing member and the second image forming portion does not form a toner image on the second image bearing member, thereby forming an image on the recording material, is executed, wherein, in the monochrome image forming mode, an absolute value of a first voltage lower than a minimum value of absolute values of a plurality of voltages applied to the plurality of grid electrodes of the first image forming portion and higher than an absolute value of a target potential of a surface of the second image bearing member in the monochrome image forming mode is applied to one of the plurality of grid electrodes of the second image forming portion, and no voltage is applied to other grid electrodes except the grid electrode to which the first voltage is applied among the plurality of grid electrodes of the second image forming portion.

2. The image forming apparatus according to claim 1, wherein in the monochrome image forming mode, the first voltage is applied to any one of the grid electrodes other than the fourth grid electrode among the plurality of grid electrodes of the second image forming portion, and no voltage is applied to the fourth grid electrode.

3. The image forming apparatus according to claim 1, wherein in the monochrome image forming mode, the first voltage is applied to the third grid electrode, and no voltage is applied to the fourth grid electrode.

4. The image forming apparatus according to claim 1, wherein the controller controls each of the first image forming portion and the second image forming portion so that a color image forming mode, in which, in a state where the intermediate transfer member is in contact with each of the first image bearing member and the second image bearing member and in a state where each of the first image bearing member and the second image bearing member is rotationally driven, the first image forming portion forms a toner image on the first image bearing member and the second image forming portion forms a toner image on the second image bearing member, thereby forming an image on the recording material, is executed, and wherein, in the color image forming mode, an absolute value of a voltage equal to or lower than an absolute value of a target potential of the surface of the second image bearing member in the color image forming mode is applied to grid electrodes other than the fourth grid electrode among the plurality of grid electrodes of the second image forming portion, and an absolute value of a voltage higher than the absolute value of the target potential of the surface of the second image bearing member in the color image forming mode is applied to the fourth grid electrode.

5. The image forming apparatus according to claim 1, wherein the controller controls each of the first image forming portion and the second image forming portion so that a color image forming mode, in which, in a state where the intermediate transfer member is in contact with each of the first image bearing member and the second image bearing member and in a state where each of the first image bearing member and the second image bearing member is rotationally driven, the first image forming portion forms a toner image on the first image bearing member and the second image forming portion forms a toner image on the second image bearing member, thereby forming an image on the recording material, is executed, and wherein, in the color image forming mode, an absolute value of a voltage equal to or lower than an absolute value of a target potential of the surface of the second image bearing member in the color image forming mode is applied to the third grid electrode, and an absolute value of a voltage higher than the absolute value of the target potential of the surface of the second image bearing member in the color image forming mode is applied to the fourth grid electrode.

6. The image forming apparatus according to claim 1, wherein an aperture ratio of the fourth grid electrode is lower than an aperture ratio of the third grid electrode.

7. The image forming apparatus according to claim 1, further comprising:

a first grid electrode power source configured to apply a voltage to the third grid electrode; and a second grid electrode power source configured to apply a voltage to the fourth grid electrode.

8. An image forming apparatus that forms an image on a recording material, comprising:

a first image forming portion including a rotatable first image bearing member and a first charging device configured to charge the first image bearing member by a plurality of corona chargers including a first corona charger having a first discharge electrode and a first grid electrode and disposed at a most upstream position with respect to a rotation direction of the first image bearing member, and a second corona charger having a second discharge electrode and a second grid electrode and disposed at a most downstream position in the rotation direction of the first image bearing member, the first image forming portion being configured to form a toner image on the first image bearing member;

a second image forming portion including a rotatable second image bearing member and a second charging device configured to charge the second image bearing member by a plurality of corona chargers including a third corona charger having a third discharge electrode and a third grid electrode and disposed at a most upstream position with respect to a rotation direction of the second image bearing member and a fourth corona charger having a fourth discharge electrode and a fourth grid electrode and disposed at a most downstream position in the rotation direction of the second image bearing member, the second image forming portion being configured to form a toner image on the second image bearing member;

an intermediate transfer member which is disposed so as to be in contact with each of the first image bearing member and the second image bearing member and to which the toner image formed on the first image bearing member is transferred; and a controller configured to control each of the first image forming portion and the second image forming portion so that a monochrome image forming mode, in which, in a state in which the intermediate transfer member is in contact with each of the first image bearing member and the second image bearing member and in a state in which each of the first image bearing member and the second image bearing member is rotationally driven, the first image forming portion forms a toner image on the first image bearing member and the second image forming portion does not form a toner image on the second image bearing member, thereby forming an image on the recording material, is executed, wherein, in the monochrome image forming mode, an absolute value of a first voltage lower than a minimum value of absolute values of the plurality of voltages applied to the plurality of grid electrodes of the first image forming portion and higher than an absolute value of a target potential of a surface of the second image bearing member in the monochrome image forming mode is applied to one of the plurality of grid electrodes of the second image forming portion, and an absolute value of a second voltage lower than an absolute value of the target potential of the surface of the second image bearing member in the monochrome image forming mode is applied to the other grid electrodes except the grid electrode to which the first voltage is applied among the plurality of grid electrodes of the second image forming portion.

9. The image forming apparatus according to claim 8, wherein in the monochrome image forming mode, the first voltage is applied to any one of the grid electrodes other than the fourth grid electrode among the plurality of grid electrodes of the second image forming portion, and the second voltage is applied to the fourth grid electrode.

10. The image forming apparatus according to claim 8, wherein in the monochrome image forming mode, the first voltage is applied to the third grid electrode, and the second voltage is applied to the fourth grid electrode.

11. The image forming apparatus according to claim 8, wherein the controller controls each of the first image forming portion and the second image forming portion so that a color image forming mode, in which in a state where the intermediate transfer member is in contact with each of the first image bearing member and the second image bearing member and in a state where each of the first image bearing member and the second image bearing member is rotationally driven, the first image forming portion forms a toner image on the first image bearing member and the second image forming portion forms a toner image on the second image bearing member, thereby forming an image on the recording material, is executed, and wherein, in the color image forming mode, an absolute value of a voltage equal to or less than an absolute value of a target potential of a surface of the second image bearing member in the color image forming mode is applied to grid electrodes other than the fourth grid electrode among the plurality of grid electrodes of the second image forming portion, and an absolute value of a voltage higher than the absolute value of the target potential of the surface of the second image bearing member in the color image forming mode is applied to the fourth grid electrode.

12. The image forming apparatus according to claim 8, wherein the controller controls each of the first image forming portion and the second image forming portion so that a color image forming mode, in which, in a state where the intermediate transfer member is in contact with each of the first image bearing member and the second image bearing member and in a state where each of the first image bearing member and the second image bearing member is rotationally driven, the first image forming portion forms a toner image on the first image bearing member and the second image forming portion forms a toner image on the second image bearing member, thereby forming an image on the recording material, is executed, and wherein, in the color image forming mode, an absolute value of a voltage equal to or less than an absolute value of a target potential of a surface of the second image bearing member in the color image forming mode is applied to the third grid electrode, and an absolute value of a voltage higher than the absolute value of the target potential of the surface of the second image bearing member in the color image forming mode is applied to the fourth grid electrode.

13. The image forming apparatus according to claim 8, wherein an aperture ratio of the fourth grid electrode is lower than an aperture ratio of the third grid electrode.

14. The image forming apparatus according to claim 8, further comprising:

a first grid electrode power source configured to apply a voltage to the third grid electrode; and a second grid electrode power source configured to apply a voltage to the fourth grid electrode.

* * * * *